(12) United States Patent
Claessens et al.

(10) Patent No.: US 11,402,589 B2
(45) Date of Patent: Aug. 2, 2022

(54) MECHANICAL CONNECTION INTERFACE FOR A TELECOMMUNICATIONS COMPONENT

(71) Applicant: COMMSCOPE TECHNOLOGIES LLC, Hickory, NC (US)

(72) Inventors: Bart Mattie Claessens, Hasselt (BE); Roger Joseph Alaerts, Aarschot (BE); William Alan Carrico, Raleigh, NC (US); Jozef Christiaan Mathieu Versleegers, Bree (BE); Marc Eugène Willem Bervoets, Hasselt (BE)

(73) Assignee: CommScope Technologies LLC, Hickory, NC (US)

( * ) Notice: Subject to any disclaimer, the term of this patent is extended or adjusted under 35 U.S.C. 154(b) by 74 days.

(21) Appl. No.: 17/049,924

(22) PCT Filed: Apr. 19, 2019

(86) PCT No.: PCT/US2019/028245
§ 371 (c)(1),
(2) Date: Oct. 22, 2020

(87) PCT Pub. No.: WO2019/209643
PCT Pub. Date: Oct. 31, 2019

(65) Prior Publication Data
US 2021/0239917 A1    Aug. 5, 2021

Related U.S. Application Data (60) Provisional application No. 62/661,437, filed on Apr. 23, 2018.

(51) Int. Cl.
*G02B 6/38*    (2006.01)
*G02B 6/44*    (2006.01)
(Continued)

(52) U.S. Cl.
CPC ......... *G02B 6/3897* (2013.01); *G02B 6/4454* (2013.01); *F16B 5/0664* (2013.01); *F16B 21/09* (2013.01); *F16B 2200/30* (2018.08)

(58) Field of Classification Search
CPC ... G02B 6/3897; G02B 6/4454; F16B 5/0664; F16B 21/09; F16B 2200/30
See application file for complete search history.

(56) References Cited

U.S. PATENT DOCUMENTS 5,337,211 A     8/1994  Reiner et al.
6,304,707 B1 * 10/2001  Daems ................. G02B 6/4442
                                                  385/71

(Continued)

FOREIGN PATENT DOCUMENTS

WO    2019/160995 A1    8/2019

OTHER PUBLICATIONS

International Search Report and Written Opinion of the International Searching Authority for International Patent Application No. PCT/US2019/028245 dated Aug. 9, 2019, 7 pages.

(Continued)

*Primary Examiner* — Ryan A Lepisto
(74) *Attorney, Agent, or Firm* — Merchant & Gould P.C.

(57) ABSTRACT

A mechanical connection interface for connecting and releasing optical components is disclosed. The mechanical connection interface includes a slide latch arrangement for securing an optical component such as a splice holder to a structure such as a tray.

24 Claims, 12 Drawing Sheets

(51) Int. Cl.
*F16B 5/06* (2006.01)
*F16B 21/09* (2006.01)

(56) References Cited

U.S. PATENT DOCUMENTS

| | | | | | |
|---|---|---|---|---|---|
| 6,944,389 | B2 * | 9/2005 | Giraud | ............... | G02B 6/4455 |
| | | | | | 385/134 |
| 7,272,291 | B2 * | 9/2007 | Bayazit | ............... | G02B 6/4454 |
| | | | | | 385/137 |
| 7,310,471 | B2 * | 12/2007 | Bayazit | ............... | G02B 6/4471 |
| | | | | | 385/137 |
| 7,330,629 | B2 * | 2/2008 | Cooke | ............... | G02B 6/4471 |
| | | | | | 385/139 |
| 7,502,542 | B2 * | 3/2009 | Fujisawa | ............... | B08B 11/02 |
| | | | | | 385/134 |
| 7,664,360 | B2 * | 2/2010 | Cox | ............... | G02B 6/4439 |
| | | | | | 385/134 |
| 8,123,185 | B2 * | 2/2012 | Winig | ............... | A47F 5/0815 |
| | | | | | 248/221.11 |
| 8,285,104 | B2 * | 10/2012 | Davis | ............... | G02B 6/4471 |
| | | | | | 385/135 |
| 8,538,227 | B2 * | 9/2013 | Cowen | ............... | G02B 6/4471 |
| | | | | | 385/136 |
| 9,042,702 | B2 * | 5/2015 | Rodriguez | ............... | G02B 6/36 |
| | | | | | 385/136 |
| 9,057,859 | B2 * | 6/2015 | Solheid | ............... | G02B 6/4455 |
| 9,541,726 | B2 * | 1/2017 | Geens | ............... | G02B 6/4477 |
| 9,684,143 | B2 * | 6/2017 | Chen | ............... | F16B 21/09 |
| 11,194,112 | B2 * | 12/2021 | Collart | ............... | G02B 6/4477 |
| 11,199,674 | B2 * | 12/2021 | Allen | ............... | G02B 6/4453 |
| 2008/0258018 | A1 | 10/2008 | Cox et al. | | |
| 2009/0044456 | A1 * | 2/2009 | Syed | ............... | B60J 5/0416 |
| | | | | | 49/460 |
| 2010/0322578 | A1 | 12/2010 | Cooke et al. | | |
| 2013/0105420 | A1 * | 5/2013 | Ray | ............... | G02B 6/4454 |
| | | | | | 29/559 |
| 2014/0079366 | A1 | 3/2014 | Rodriguez et al. | | |
| 2014/0205254 | A1 * | 7/2014 | Rudenick | ............... | G02B 6/444 |
| | | | | | 385/135 |
| 2016/0161695 | A1 | 6/2016 | Chen et al. | | |

OTHER PUBLICATIONS

Extended European Search Report for European Patent Application No. 19793744.4 dated Dec. 15, 2021, 10 pages.

* cited by examiner

MECHANICAL CONNECTION INTERFACE FOR A TELECOMMUNICATIONS COMPONENT

CROSS-REFERENCE TO RELATED APPLICATION

This application is a National Stage Application of PCT/US2019/028245, filed on Apr. 19, 2019, which and claims the benefit of U.S. Patent Application Ser. No. 62/661,437, filed on Apr. 23, 2018, the disclosures of which are incorporated herein by reference in their entireties. To the extent appropriate, a claim of priority is made to each of the above disclosed applications.

TECHNICAL FIELD

The present disclosure relates generally to fiber optic systems and devices. More particularly, the present disclosure relates to devices and systems for mounting fiber optic components to fiber management trays or other structures.

BACKGROUND

Optical fiber distribution systems may include equipment such as fiber management trays that are mounted in telecommunications enclosures or at other locations. A typical fiber management tray includes fiber routing paths for allowing excess length of optical fiber to be stored in looped configurations without violating minimum bend radius requirements for the optical fiber. Fiber optic components such as holders for holding fiber optic fusion splices, passive optical splitters, wavelength division multiplexers and the like are often mounted to fiber management trays. Improved structures are needed for connecting and releasing fiber optic components such as holders to and from structures such as fiber management trays or other structures.

SUMMARY

Teachings of the present disclosure relate to a mechanical connection interface that can allow for simple and reliable connecting and releasing of optical components. In certain examples, the connection interface can be easily interlocked in an intuitive manner. In certain examples, the connection interface is configured to allow a latch of the interface to be flexed down from a latching position to an unlatched position by laterally moving a component desired to be latched, as compared to requiring the latch to be directly pressed down. In certain examples, the mechanical interface allows a first component desired to be coupled to a second component to be loaded into a flush configuration relative to the second component prior to any latch or latches being flexed or deflected. This allows for more intuitive and easier coupling of the interface. In certain examples, mechanical interfaces in accordance with the principles of the present disclosure can provide actuation of a latch by direct sliding or lateral movement relative to the latch. This allows the latch to be flexed and the component to move to an interlocked position in one step, as compared to requiring the latch to be initially flexed prior to sliding the component into a latched position.

Aspects of the present disclosure relates to a mechanical connection interface for securing first and second structural elements together. In a preferred example, the structural elements are parts (e.g., pieces, components, members, etc.) of a fiber optic telecommunications system, unit or device. In one example, the first structural element is a holder for holding optical components such as passive optical splitters, wavelength division multiplexers, optical splice protectors or the like, and the second structural element is a structure such as a tray, bracket, flange, shelf, panel, housing wall, housing cover, housing base, or the like.

Another aspect of the present disclosure relates to a mechanical connection interface adapted for coupling together first and second structural elements. The mechanical interface includes first and second connection interface arrangements that are configured to be interlocked with one another to couple the first and second structural elements together. Preferably, the first and second connection interfaces can also be selectively disengaged from one another to allow the first and second structural elements to be decoupled from each other. The first connection interface arrangement defines an attachment opening defining a groove portion and an enlarged portion. The groove portion has a length that extends along a first reference line and a first width that extends perpendicular to the first reference line. The enlarged portion defines a second width perpendicular with respect to the first reference line that is larger than the first width. The first connection interface arrangement further including a flexible cantilever latch positioned within the enlarged portion of the attachment opening. The flexible cantilever latch has a length that extends along the first reference line. The flexible cantilever latch includes a base end and a free end. The enlarged portion of the attachment opening includes an interlock receiving portion defined between the free end of the flexible cantilever latch and the groove portion of the attachment opening. The free end of the flexible cantilever latch defines a stop surface, and the flexible cantilever latch defines a stop receptacle. The second connection interface arrangement includes an interlock and a stop aligned along a second reference line. The stop includes a stop surface. The interlock defines a third width that extends perpendicular to the second reference line. The third width is smaller than the second width and larger than the first width. At least one of the stop receptacle and the stop includes a ramp surface. The second connection interface arrangement is connected to the first connection interface arrangement by orienting the second connection interface arrangement in a first position relative to the first connection interface arrangement in which: a) the first and second reference axes are aligned; b) the interlock is received within interlock receiving portion of the enlarged portion of the attachment opening; and c) the first stop is positioned within the stop receptacle of the of the flexible cantilever latch; and then sliding the second connection interface arrangement along the aligned first and second reference axes from the first position to a second position in which: a) the first interlock is received within and interlocked with the groove portion of the attachment opening; b) the stop is positioned within the interlock receiving portion of the enlarged portion of the first attachment opening with the stop surface of the stop opposing the stop surface at the free end of the flexible cantilever latch; c) the interlock is received within and interlocked with the groove portion of the second attachment opening. As the second connection interface arrangement is slid from the first position to the second position, the ramp surface causes the flexible cantilever latch to deflect from a latching position to an unlatched position. After the stop moves past the free end of the flexible cantilever latch, the flexible cantilever latch elastically returns from the unlatched position to the latching position.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventions and inventive concepts upon which the examples disclosed herein are based.

DETAILED DESCRIPTION

FIGS. 1-4 show an optical interface unit in accordance with the principles of the present disclosure. The optical interface unit can be configured to provide a number of different functions. One example function relates to providing protection for locations in the field where the optical fibers of fiber optic cables (e.g., distribution cables, drop cables, etc.) are accessed. For example, fiber optic cables can be routed into the optical interface unit and within the optical interface unit at least portions of the outer the outer jackets of the fiber optic cables can be removed (e.g., via window cuts or by ring cutting the jackets and stripping off portions of the jackets between the ring cuts) to expose the optical fibers for access within the optical interface unit. In certain examples, the optical interface unit is environmentally sealed to protect the optical fiber access locations. Another example function relates to providing optical connections between optical fibers accessed within the optical interface unit. For example, the optical interface unit can include internal structure for making optical connections (e.g., optical splices such as optical fusion splices or mechanical splices, demateable connections such optical connections between optical connectors either through direct mating or via intermediate fiber optic adapters, or other connections) between optical fibers accessed in the field. A further example function relates to adding functionality in the field. For example, the optical interface unit can house value-added optical components such as passive optical splitters (symmetric or asymmetric such as an optical tap), wavelength division multi-plexers (coarse or fine), optical splices protected within splice reinforcing sleeves (e.g., heat shrink sleeves containing each containing a reinforcing rod and adhesive), fiber optic connectors, fiber optic adapters and the like. In certain examples, value added components can be secured to component holders that are secured within the optical interface unit (e.g., to trays, brackets, flanges, shelfs, panels, housing walls, housing covers, housing bases, or the like).

The optical interface unit of FIGS. 1-14 include a telecommunications enclosure 100 having a housing 110 that is preferably environmentally sealed when closed. The housing 110 includes a base 113 and a cover 114. The cover 114 is movable between an open position and a closed position. As depicted, the cover 114 is attached to the base by a hinge that allows the cover to be pivoted relative to the base 113 between the open position and the closed position. An interior of the housing 110 is accessible when the cover is in the open position. Latches 115 can be used to retain the housing in the closed position. The enclosure includes a sealing arrangement 120 for environmentally sealing the housing 110 when the housing 110 is closed. The sealing arrangement 120 can include a perimeter seal 124 for sealing a perimeter interface between the cover 114 and the base, and a cable sealing unit 125 for sealing locations where cables enter/exit the housing. The optical interface unit also includes a management unit 130 that mounts within the housing. The management unit 130 includes a main frame/support infrastructure 133 having a front side 135 and a back side 131. The support infrastructure 133 includes a front cover 137 and an adapter mounting location 136 at the front side 135. Fiber optic adapters 150 are mounted at the adapter mounting location 136. Cable anchoring structures (e.g., clamping locations, tie-down locations, etc.) are provided on the infrastructure 133 adjacent the cable sealing unit 125. A rear fiber management tray 138 is pivotally mounted at the back side 131 of the support infrastructure 133. Support brackets 141 are also mounted at the back side 131. The support brackets 141 can be connected to side walls of the infrastructure 133 by a dove-tail interface 139 and a flexible retaining latch 143. Each of the brackets 141 can include a first connection interface arrangement 700 that is part of a mechanical connection interface 702 in accordance with the principles of the present disclosure. The mechanical connection interface 702 also includes a second connection interface arrangement 704 included as part of a component holder 706 adapted for holding optical components such as a splice reinforcing sleeves for protecting optical fusion splices, passive optical splitters or wavelength division multiplexers. The first and second connection arrangements 700, 704 are adapted to interlock to secure the component holder 706 to the bracket 141. In other examples, the connection arrangements 700, 704 can be reversed so that the first connection arrangement 700 is on the component holder and the second connection arrangement 704 is on the bracket 141. It will be appreciated that the bracket is just one example of a type of structure to which a component holder can be secured using mechanical connection interfaces in accordance with the principles of the present disclosure. Other example structures include trays, flanges, shelfs, panels, housing walls, housing covers, housing bases, and the like.

Figure 1:
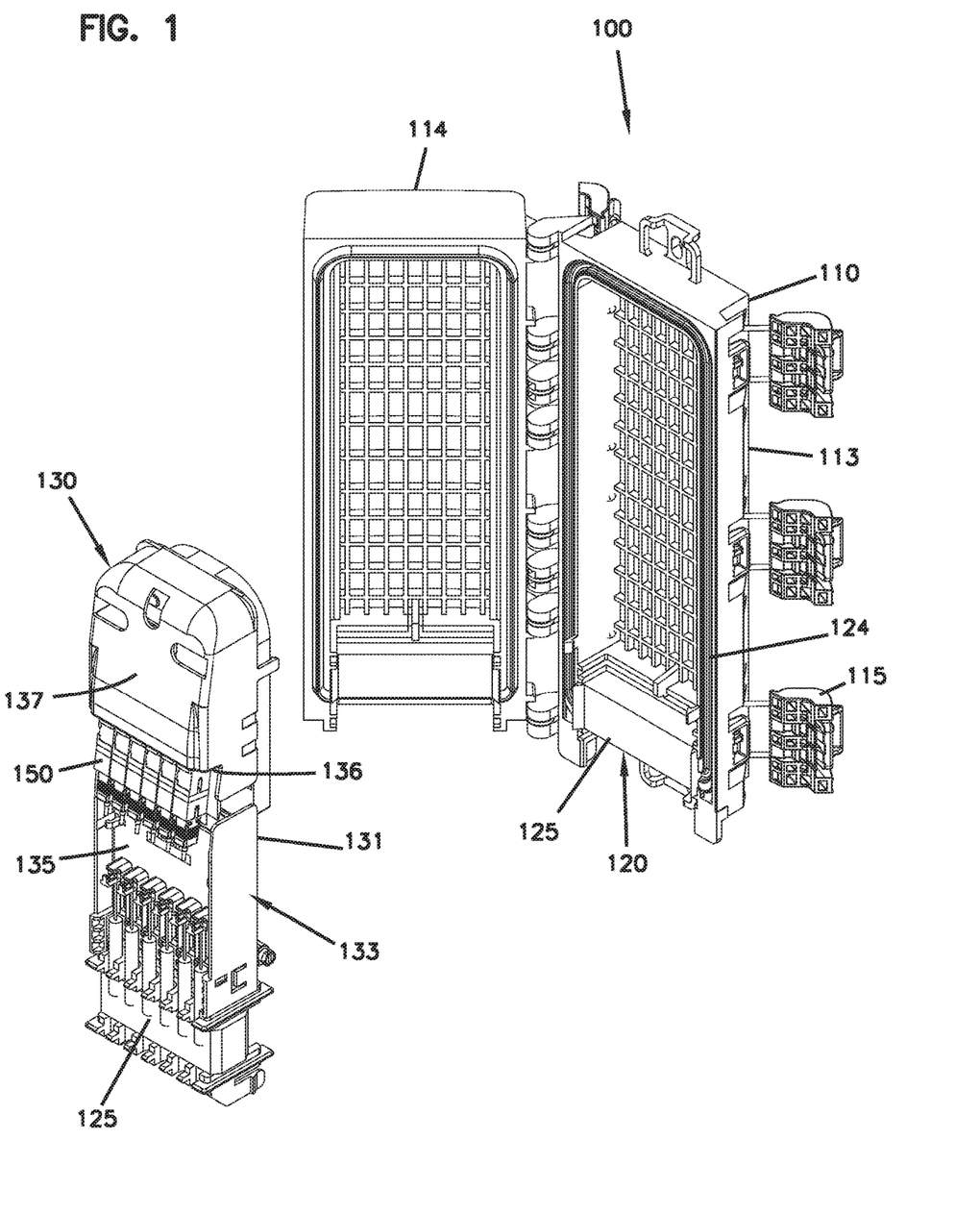
FIG. 1 depicts an optical interface unit including an enclosure and a fiber management unit that mounts in the enclosure.
Figure 2:
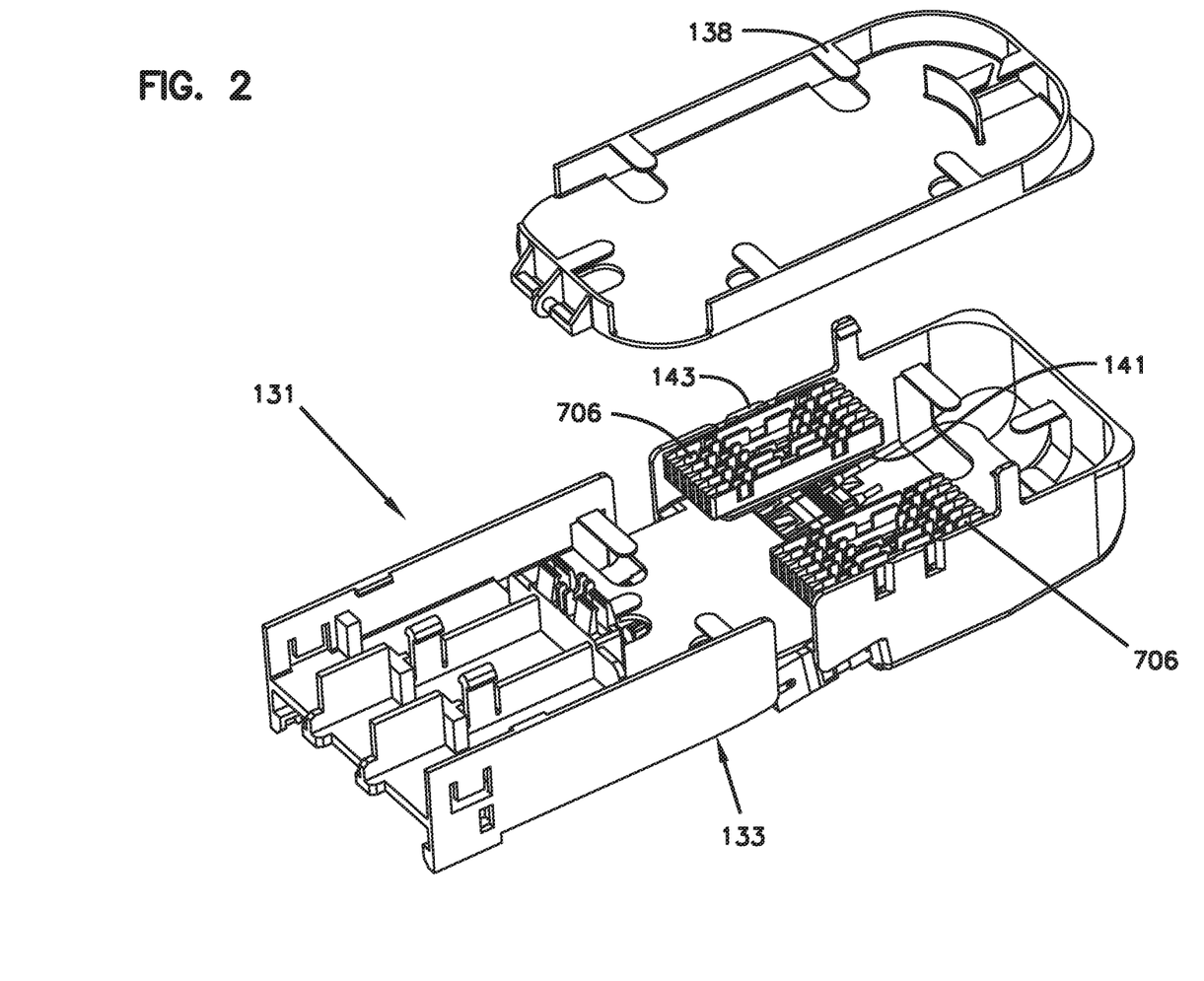
FIG. 2 is a bottom, perspective view of the management unit of FIG. 1.
Figure 3:
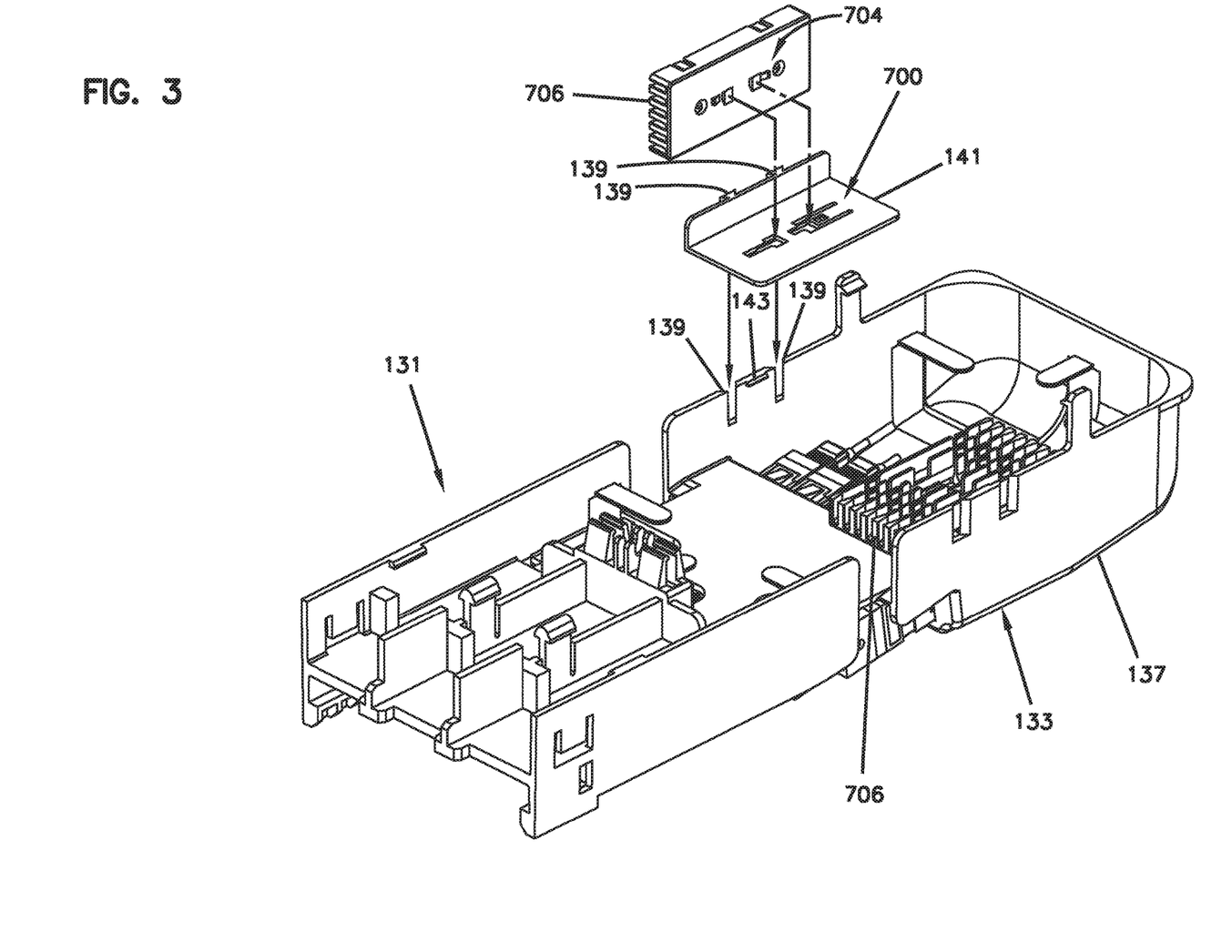
FIG. 3 shows the management unit of FIG. 2 with a bracket exploded upwardly from a main infrastructure of the management unit, the bracket includes a first connection interface arrangement adapted to interlock with a second connection interface arrangement corresponding to a component desired to be attached to the bracket.
Figure 4:
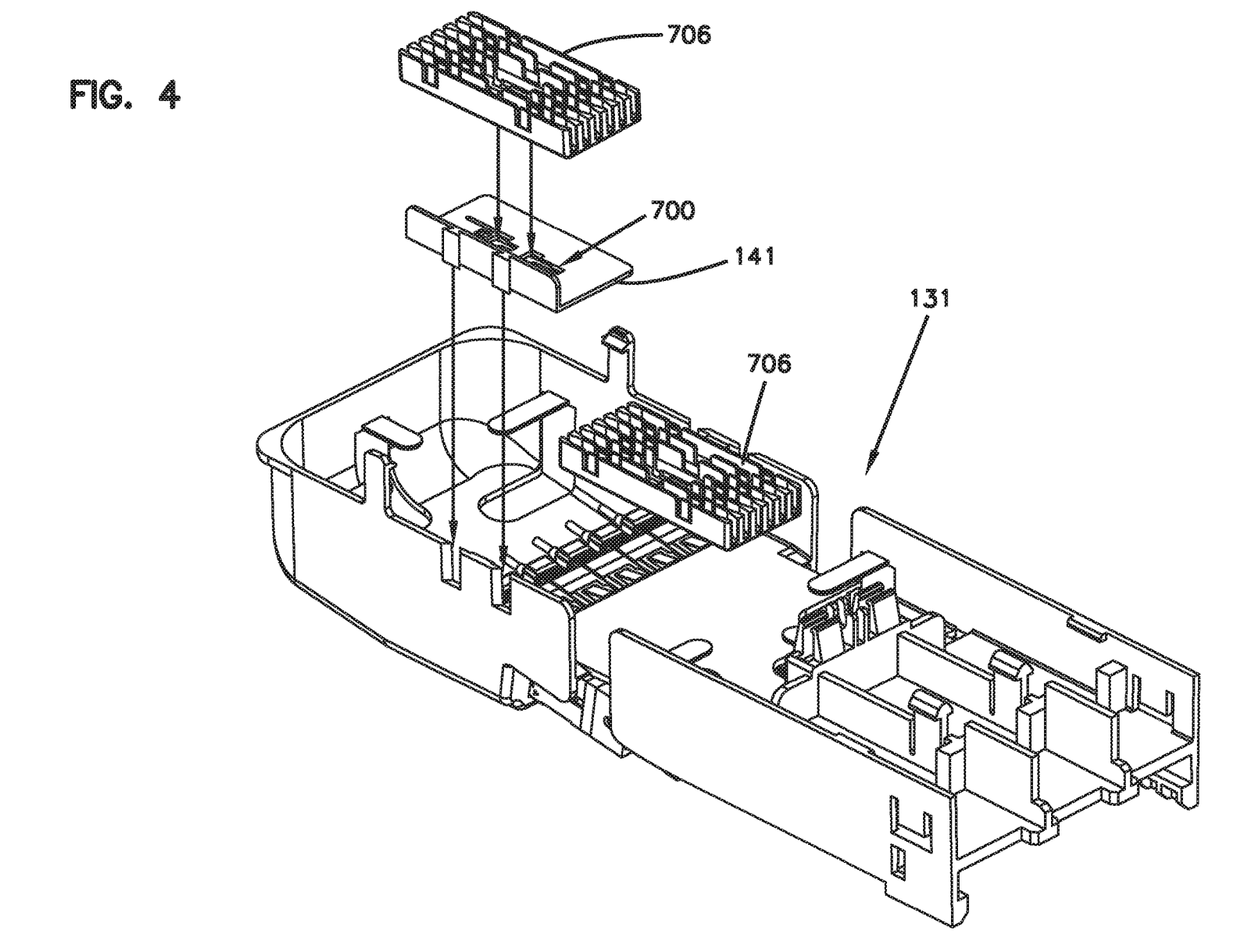
FIG. 4 is another exploded view showing the bracket and the fiber optic component of FIG. 3.
Figure 5:
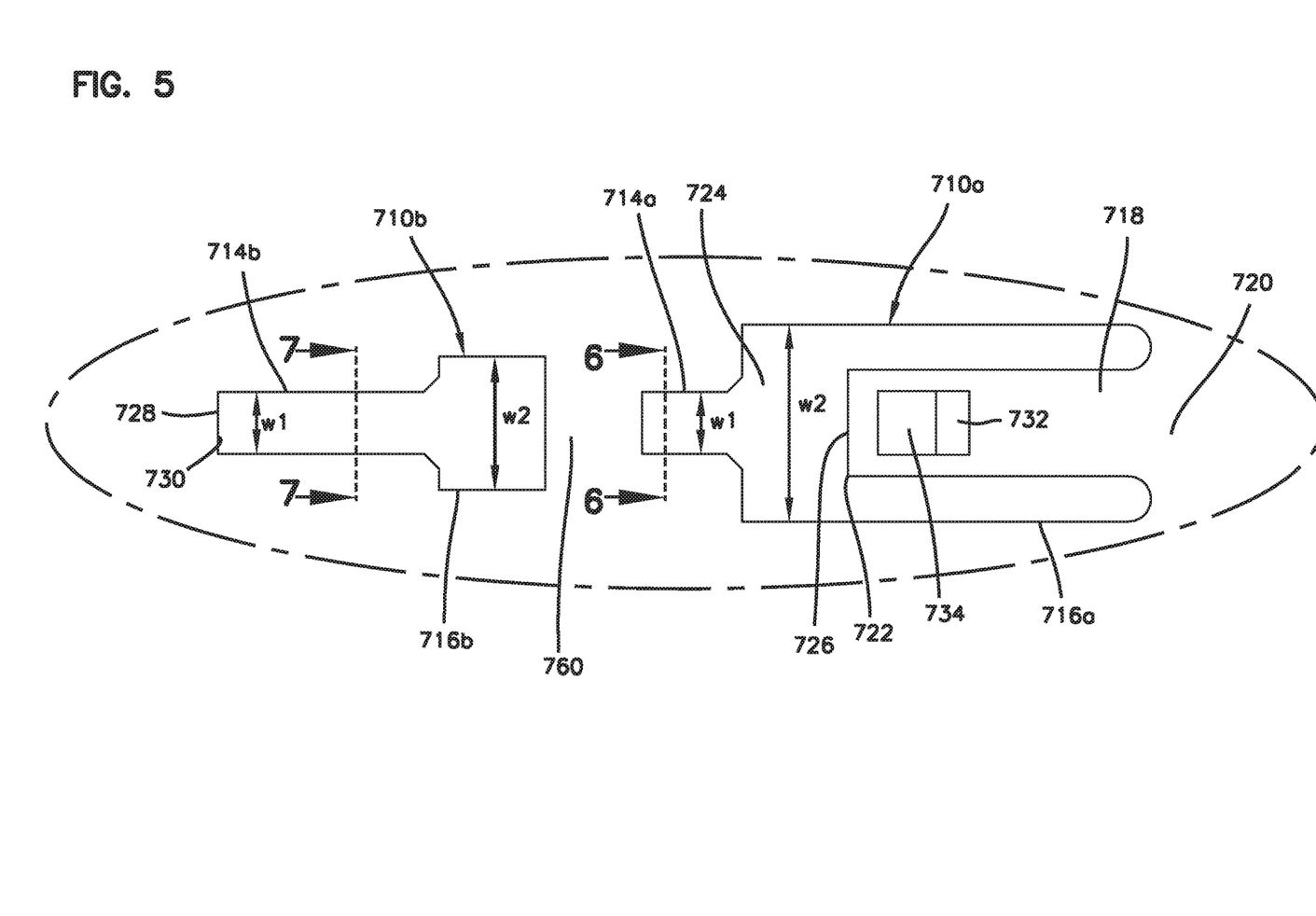
FIG. 5 is an enlarged plan view showing the first connection interface arrangement which corresponds to the bracket of FIG. 4.

Referring to FIG. 5, the first connection interface arrangement 700 defines first and second attachment openings 710a, 710b aligned along a first reference line 712. The first and second attachment openings 710a, 710b each defining a groove portion 714a, 714b and an enlarged portion 716a, 716b. The groove portions 714a, 714b have lengths that extend along the first reference line 712 and first widths W1 that extend perpendicular to the first reference line 712. The enlarged portions 716a, 716b define second widths W2 that are larger than the first widths W1 and that are perpendicular to the first reference line 712. The first connection interface arrangement 700 further includes a flexible cantilever latch 718 positioned within the enlarged portion 716a of the first attachment opening 710a. The flexible cantilever latch 718 has a length that extends along the first reference line 712 between a base end 720 and a free end 722 of the flexible cantilever latch 718. The enlarged portion 716a of the first attachment opening 710a includes an interlock receiving portion 724 defined between the free end 722 of the flexible cantilever latch 718 and the groove portion 714a of the first attachment opening 710a. The free end 722 of the flexible cantilever latch 718 defines a first stop surface 726. The groove portion 714b of the second attachment opening 710b has an end 728 positioned opposite from the enlarged portion 716b of the second attachment opening 710b which defines a second stop surface 730. A top side of the flexible cantilever latch 718 defines a stop receptacle 732 including a ramp surface 734.

Referring to FIGS. 8-14, the second connection interface arrangement 704 integrated with the component holder 706 includes a first interlock 736a, a second interlock 736b, a first stop 738a and a second stop 738b all aligned along a second reference line 740. The first and second interlocks 736a, 736b are positioned between the first and second stops 738a, 738b. The first and second stops 738a, 738b include stop surfaces 742a, 742b that face at least partially away from the first and second interlocks 736a, 736b. The first and second stops 738a, 738b have ramp surfaces 744a, 744b that face at least partially toward the first and second interlocks 736a, 736b. The first and second interlocks 736a, 736b define third widths W3 that are perpendicular to the second reference line 740. The third widths W3 are smaller than the second widths W2 of the enlarged portions 716a, 716b of the first and second attachment openings 710a, 710b. The third widths W3 are larger than the first widths W1 of the groove portions 714a, 714b of the first and second attachment openings 710a, 710b. The first and second interlocks 736a, 736b are separated by a spacing S1 (FIG. 10) along the second reference line 740 that corresponds to a spacing S2 (FIG. 5) between the enlarged portions 716a, 716b of the first and second attachment openings 710a, 710b along the first reference line 712.

Figure 11:
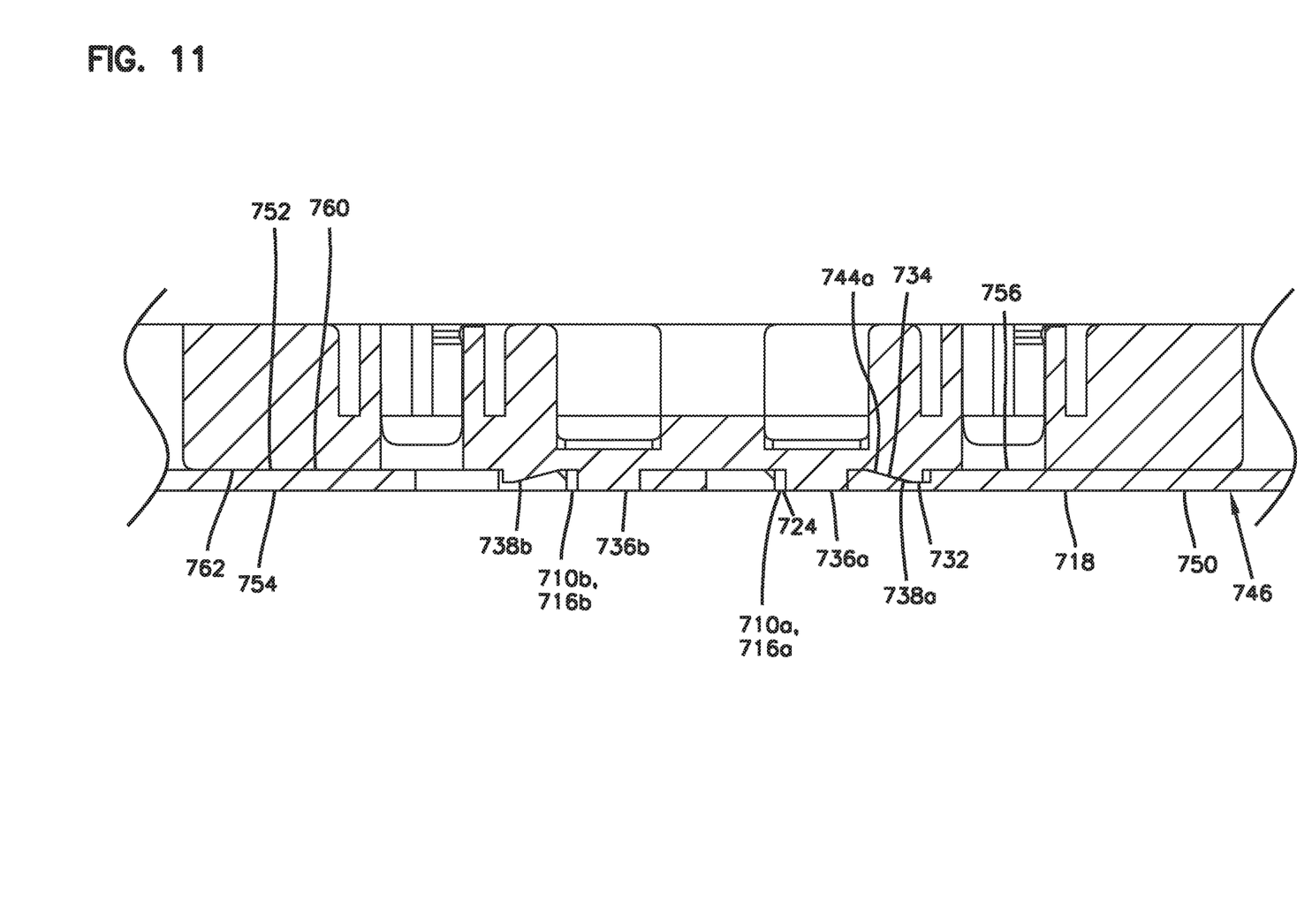
FIG. 11 shows the second connection interface arrangement in a first, pre-interlocked, position relative to the first connection interface arrangement.
Figure 12:
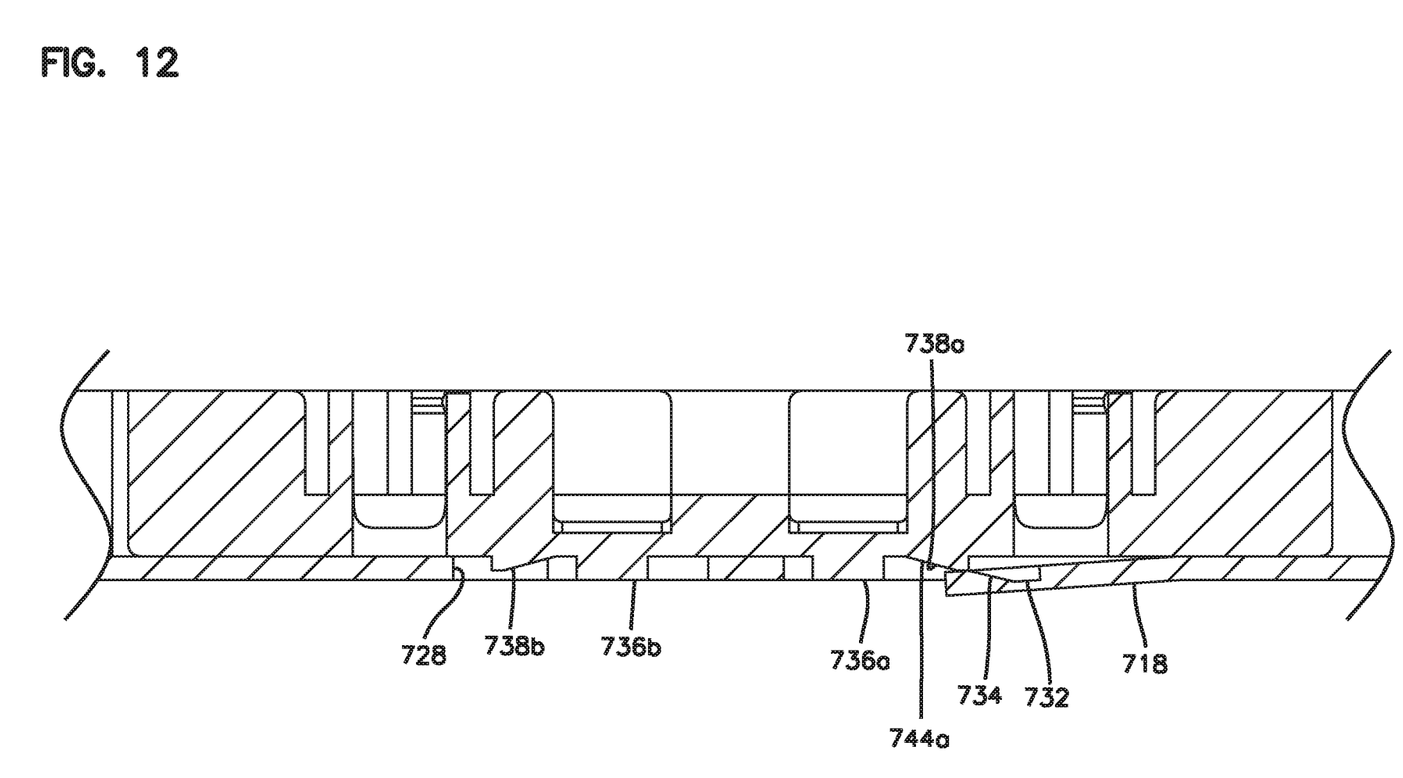
FIG. 12 shows the second connection interface arrangement in the process of being slid laterally relative to the first connection interface arrangement in a direction from the pre-interlocked first position of FIG. 11 toward a second, locked position.

The second connection interface arrangement 704 is connected to the first connection interface arrangement 700 by orienting the second connection interface 704 arrangement in a first position relative to the first connection interface arrangement 700 (see FIG. 11). In the first position, the first and second connections interface arrangements 700, 704 are relatively positioned such that: a) the first and second reference axes 712, 740 are aligned; b) the first interlock 736a is received within interlock receiving portion 724 of the enlarged portion 716a of the first attachment opening 710a; c) the second interlock 736b is received within the enlarged portion 716b of the second attachment opening 710b; and d) the first stop 738a is positioned within the stop receptacle 732 of the of the flexible cantilever latch 718 with the ramp surface 744a of the first stop 738a opposing the ramp surface 734 of the stop receptacle 732.

Figure 13:
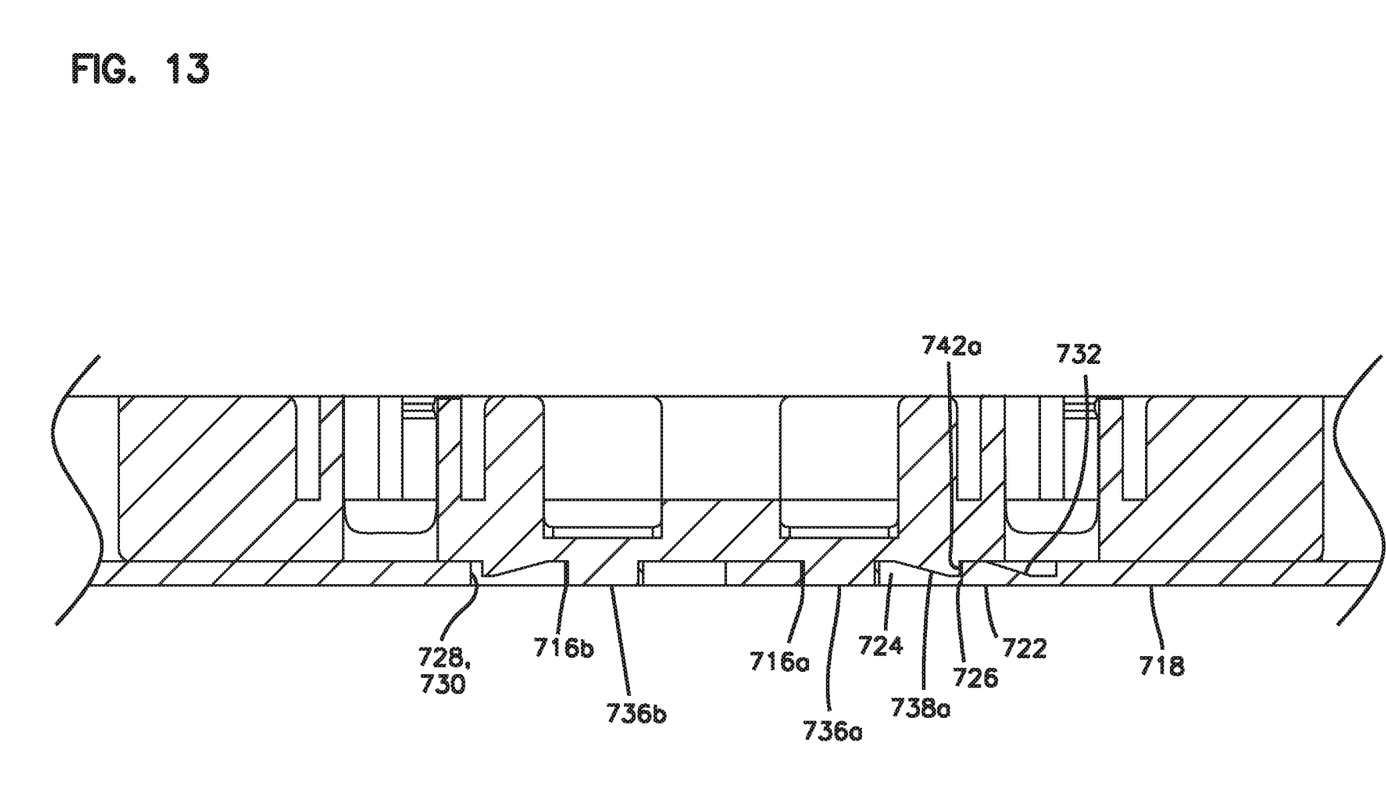
FIG. 13 shows the second connection interface in the locked, second position relative to the first connection interface.

After the first and second connection interface arrangements 700, 704 have been relatively oriented in the first position of FIG. 11, the second connection interface arrangement 704 is slid relative to the first connection interface arrangement 700 along the aligned first and second reference axes 712, 740 from the first position to a second position (see FIG. 13). In the second position of FIG. 13, the first and second connection interface arrangements 700, 704 are relatively positioned such that: a) the first interlock 736a is received within and interlocked with the groove portion 714a of the first attachment opening 710a; b) the first stop 738a is positioned within the interlock receiving portion 724 of the enlarged portion 716a of the first attachment opening 710a with the stop surface 742a of the first stop 738a opposing the first stop surface 726 at the free end 722 of the flexible cantilever latch 718; c) the second stop 738b is positioned within the groove portion 714b of the second attachment opening 710b with the stop surface 742b of the second stop 738b opposing the second stop surface 730 at the end of the groove portion 714b of the second attachment opening 710b; and d) the second interlock 736b is received within and interlocked with the groove portion 714b of the second attachment opening 710b.

As the second connection interface arrangement 704 is slid from the first position to the second position, the ramp surface 744a of the first stop 738a engages the ramp surface 734 of the stop receptacle 732 to cause deflection of the flexible cantilever latch 718 (see FIG. 12) from a latching position to an unlatched position. After the first stop 738a moves past the free end 722 of the flexible cantilever latch 718, the flexible cantilever latch 718 elastically returns from the unlatched position to the latching position.

Figure 6:
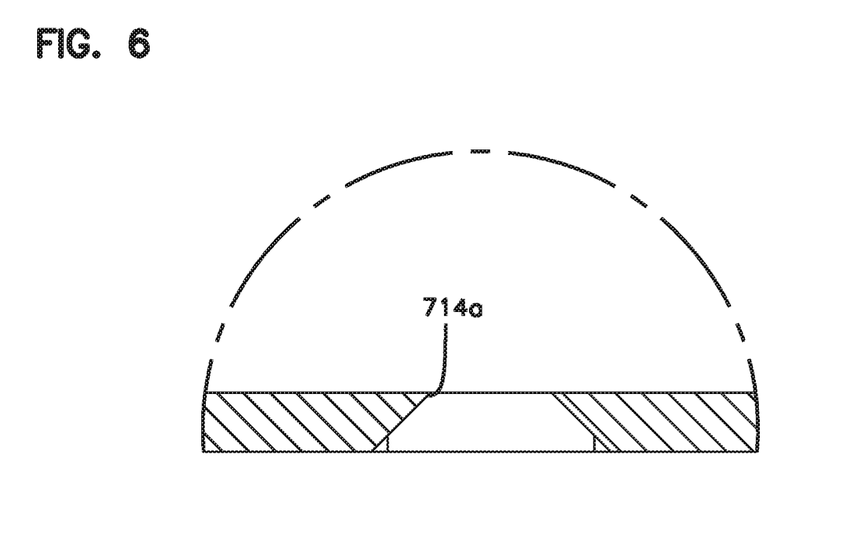
FIG. 6 is a cross-sectional view taken along section line 6-6 of FIG. 5.
Figure 7:
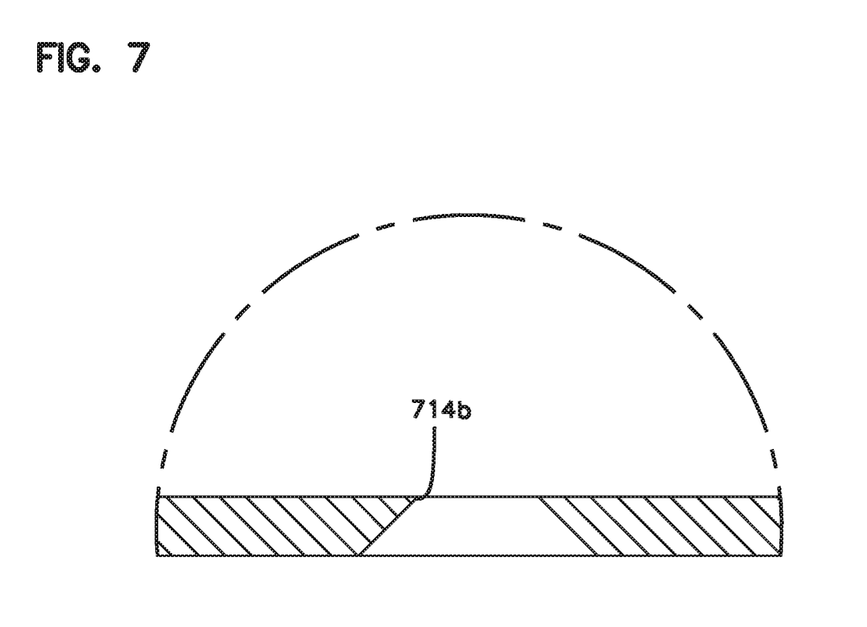
FIG. 7 is a cross-sectional view taken along section line 7-7 of FIG. 5.
Figure 8:
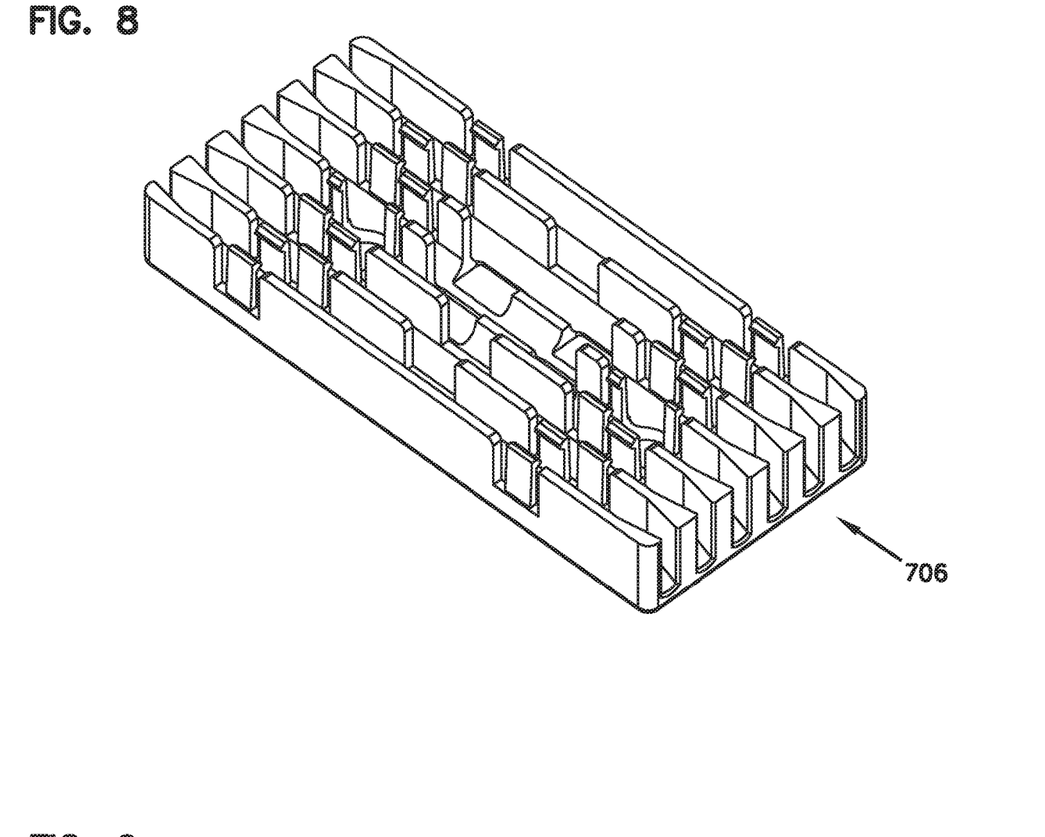
FIG. 8 is a perspective, primarily top view of the fiber optic component of FIG. 4.
Figure 9:
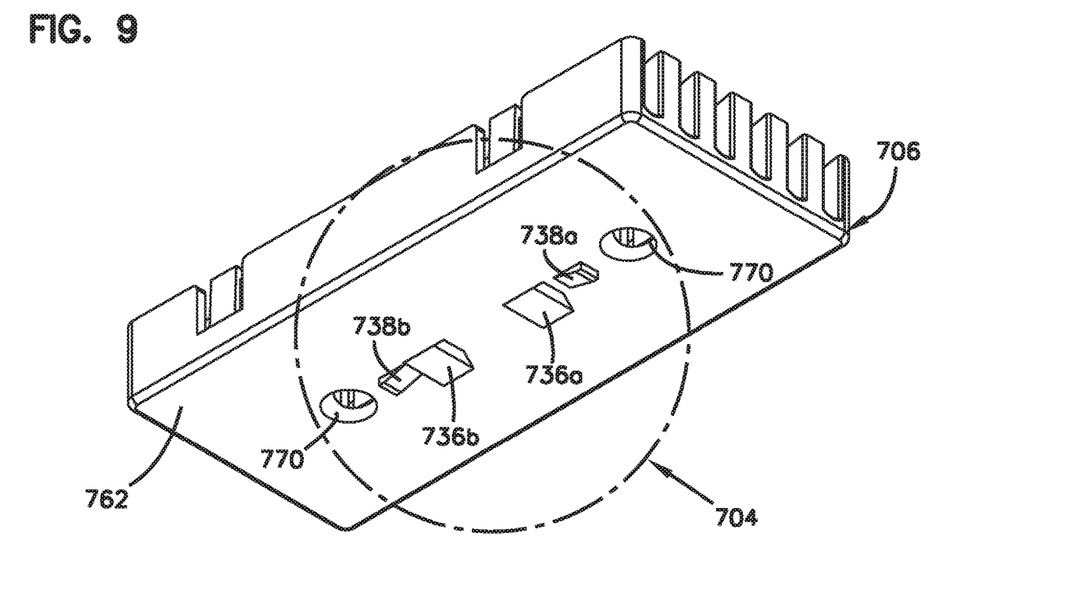
FIG. 9 is a perspective, primarily bottom view of the component of FIG. 8 showing the second connection interface arrangement adapted to interlock with the first connection interface arrangement of FIG. 5.
Figure 10:
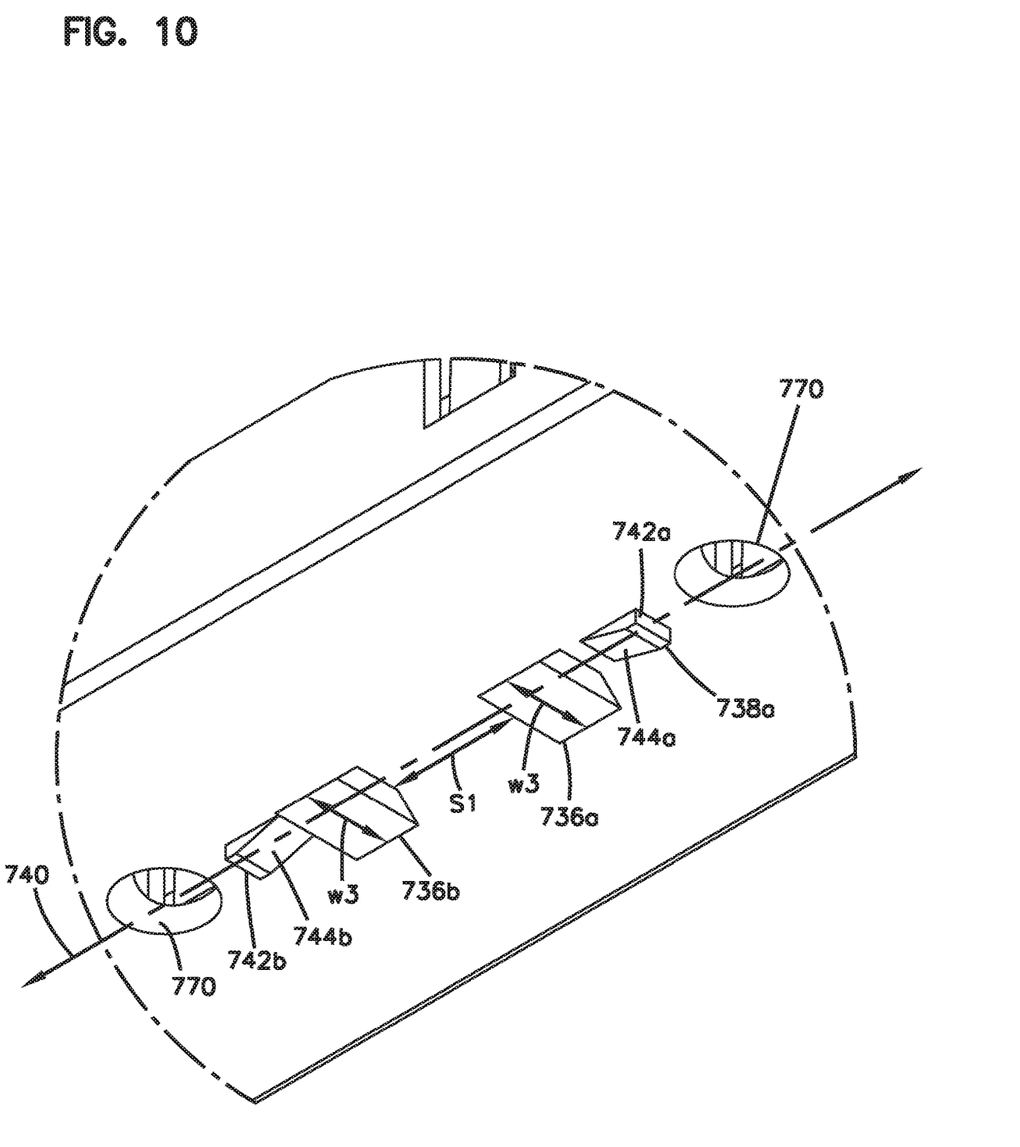
FIG. 10 is an enlarged view of the second connection interface arrangement of FIG. 9.

The groove portions 714a, 714b and the first and second interlocks 736a, 736b have dovetailed shapes in cross-sectional planes that are perpendicular to the first and second reference lines 712, 740 (see FIGS. 6 and 7). The stop surfaces 742a, 742b of the first and second stops 738a, 738b face at least partially in opposite directions. The ramp surfaces 744a, 744b of the first and second stops 738a, 738b face partially towards each other. The first and second stop surfaces 726, 730 of the first connection interface arrangement 700 face at least partially towards each other.

A main body 749 of the bracket 741 includes first portion 750 having a top side 752 and a bottom side 754. The base end 720 of the flexible cantilever latch 718 is unitarily formed with the main body 749. The first and second attachment openings 710a, 710b extend through the first portion 750 of the main body 749 from the top side 752 to the bottom side 754. The stop receptacle 732 of the flexible cantilever latch 718 is defined at a top side 756 of the flexible cantilever latch 718 that is coplanar with the top side 752 of the first portion 750 of the main body 749 when the flexible cantilever latch 718 is in the latching position. The stop receptacle 732 extends downwardly into the flexible cantilever latch 718 from the top side 756 of the flexible cantilever latch 718 so that the stop receptacle 732 extends lower than the top side 752 of the first portion 750 of the main body 749 when the flexible cantilever latch 718 is in the latching position.

The first connection interface arrangement 700 defines a first seating surface 760 (e.g., the top side 752 of the portion 750 of the main body 749) through which the first and second attachment openings 710a, 710b extend. The second connection interface arrangement 704 defines a second seating surface 762 (e.g., the underside of the component holder 706) from which the first interlock 736a, the second interlock 736b, the first stop 738a and the second stop 738b project. The first and second seating surfaces 760, 762 are flush when the second connection interface arrangement 704 is in the first position relative to the first connection interface arrangement 700 and are also flush when the second connection interface arrangement 704 is in the second position relative to the first connection interface arrangement 700. The flexible cantilever latch 718 is in the latching position when the second connection interface arrangement 704 is in the first position relative to the first connection interface arrangement 700, and the flexible cantilever latch 718 is also in the latching position when the second connection interface arrangement 704 is in the second position relative to the first connection interface arrangement 700. Release openings 770 are defined through the first sealing surface 760 for allowing the cantilever 718 to be depressed with a tool such that the cantilever is moved to the non-latching position thereby allowing the second connection interface arrangement 704 to be disengaged from the first connection interface arrangement 700 by sliding the component holder 706 from the second position (see FIG. 13) back to the first position (see FIG. 11).

Figure 14:
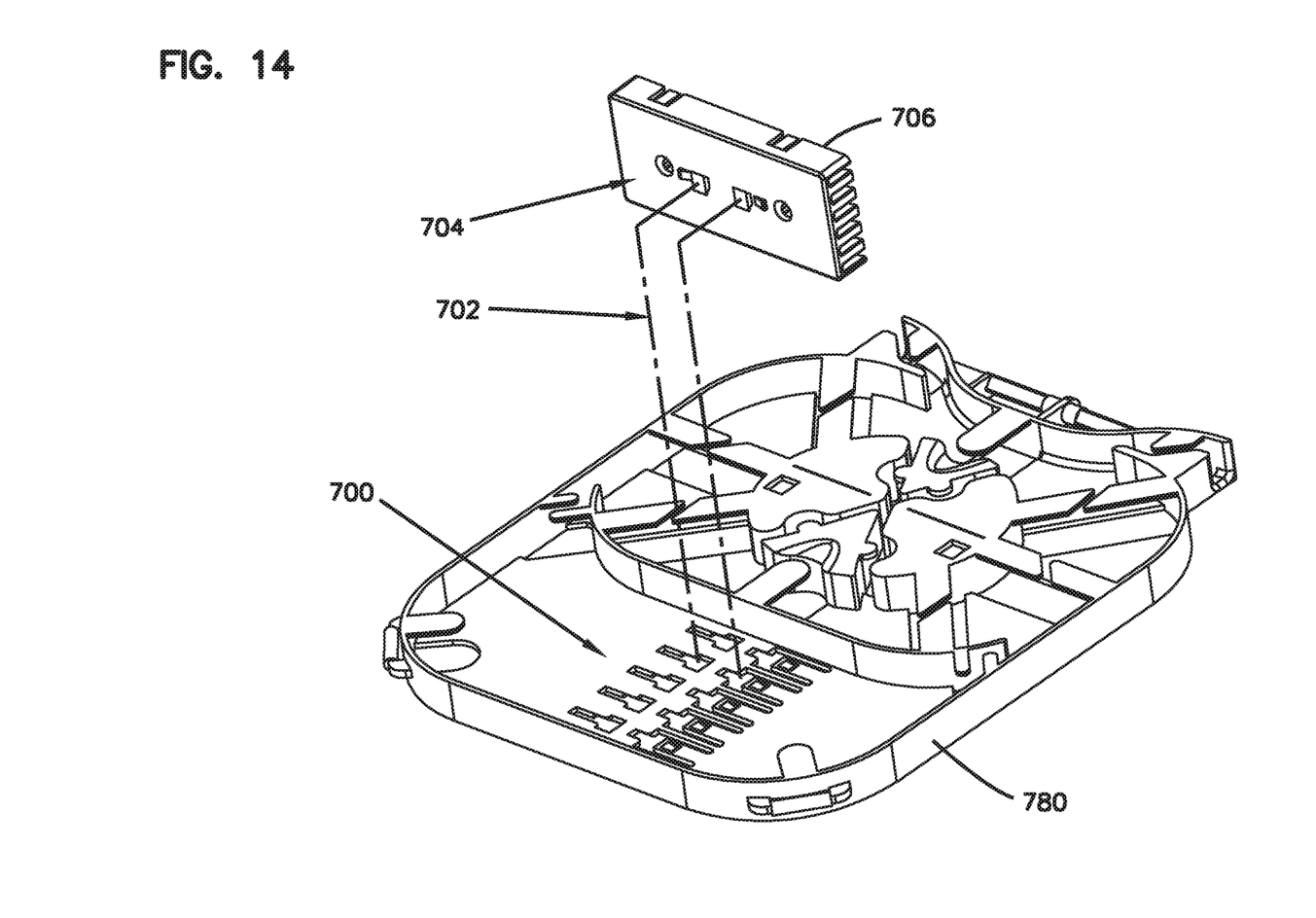
FIG. 14 shows the first connection interface integrated into a fiber management tray rather than into a bracket as shown in the previous examples.

FIG. 14, shows the first connection interface arrangement 700 integrated into a fiber management tray 780 so that the component holder 706 including the second connection interface arrangement 704 can be readily coupled to the fiber management tray 780 by the mechanical connection interface 702.

What is claimed is:

1. A mechanical connection interface comprising:
    a first connection interface arrangement defining an attachment opening defining a groove portion and an enlarged portion, the groove portion having a length that extends along a first reference line and a first width that extends perpendicular to the first reference line, the enlarged portion defining a second width perpendicular to the first reference line that is larger than the first width, the first connection interface arrangement further including a flexible cantilever latch positioned within the enlarged portion of the attachment opening, the flexible cantilever latch having a length that extends along the first reference line, the flexible cantilever latch including a base end and a free end, the enlarged portion of the attachment opening including an interlock receiving portion defined between the free end of the flexible cantilever latch and the groove portion of the attachment opening, the free end of the flexible cantilever latch defining a stop surface, and the flexible cantilever latch defining a stop receptacle;
    a second connection interface arrangement configured to interlock with the first connection interface arrangement, the second connection interface arrangement including an interlock and a stop aligned along a second reference line, the stop including a stop surface, the interlock defining a third width that extends perpendicular to the second reference line, the third width being smaller than the second width and larger than the first width;
    wherein at least one of the stop receptacle and the stop includes a ramp surface;
    wherein the second connection interface arrangement is connected to the first connection interface arrangement by orienting the second connection interface arrangement in a first position relative to the first connection interface arrangement in which: a) the first and second reference axes are aligned; b) the interlock is received within the interlock receiving portion of the enlarged portion of the attachment opening; and c) the stop is positioned within the stop receptacle of the flexible cantilever latch; and then sliding the second connection interface arrangement along the aligned first and second reference axes from the first position to a second position in which: a) the interlock is received within and interlocked with the groove portion of the attachment opening; and b) the stop is positioned within the interlock receiving portion of the enlarged portion of the attachment opening with the stop surface of the stop opposing the stop surface at the free end of the flexible cantilever latch; and
    wherein as the second connection interface arrangement is slid from the first position to the second position, the ramp surface causes the flexible cantilever latch to deflect from a latching position to an unlatched position, and wherein after the stop moves past the free end of the flexible cantilever latch the flexible cantilever latch elastically returns from the unlatched position to the latching position.

2. The mechanical connection interface of claim 1, wherein the first connection interface arrangement is integrated with a telecommunications component.

3. The mechanical connection interface of claim 2, wherein the telecommunication component includes structure adapted to manage optical fibers.

4. The mechanical connection interface of claim 3, wherein the telecommunications component is a tray.

5. The mechanical connection interface of claim 3, wherein the telecommunications component is a bracket.

6. The mechanical connection interface of claim 1, wherein the second connection interface arrangement is integrated with a holder adapted to hold a fiber optic component coupled to optical fibers.

7. The mechanical connection interface of claim 6, wherein the fiber optic component is a splice protector, a passive optical power splitter, or a wavelength division multi-plexer.

8. The mechanical connection interface of claim 1, wherein the groove portion and the interlock have dovetailed shapes in cross-sectional planes that are perpendicular to the first and second reference lines.

9. The mechanical connection interface of claim 2, wherein a main body of the telecommunications component includes a first portion having a top side and a bottom side, wherein the attachment opening extends through the first portion of the main body from the top side to the bottom side, wherein the base end of the flexible cantilever latch is unitarily formed with the main body, and wherein the stop receptacle of the flexible cantilever latch is defined at a top side of the flexible cantilever latch that is coplanar with the top side of the first portion of the main body when the flexible cantilever latch is in the latching position, and wherein the stop receptacle extends downwardly into the flexible cantilever latch from the top side of the flexible cantilever latch so that the stop receptacle extends lower than the top surface of the first portion of the main body when the flexible cantilever latch is in the latching position.

10. The mechanical connection interface of claim 1, wherein the first connection interface arrangement includes a first seating surface through which the attachment opening extends, wherein the second connection interface arrangement defines a second seating surface from which the interlock and the stop project, wherein the first and second seating surfaces are flush when the second connection interface arrangement is in the first position relative to the first connection interface arrangement and are also flush when the second connection interface arrangement is in the second position relative to the first connection interface arrangement, wherein the flexible cantilever latch is in the latching position when the second connection interface arrangement is in the first position relative to the first connection interface arrangement, and wherein the flexible cantilever latch is in the latching position when the second connection interface arrangement is in the second position relative to the first connection interface arrangement.

11. The mechanical connection interface of claim 1, wherein the stop receptacle and the stop include ramp surfaces, wherein the ramp surface of the stop opposes the ramp surface of the stop receptacle when the second connection interface arrangement is in the first position relative to the first connection interface arrangement, and wherein the ramp surfaces engage each other as the second connection interface arrangement is moved from the first position to the second position relative to the first connection interface arrangement to cause deflection of the flexible cantilever latch from a latching position to an unlatched position.

12. The mechanical connection interface of claim 1, wherein the attachment opening is a first attachment opening, the interlock is a first interlock and the stop is a first stop, wherein the first connection interface arrangement further includes a second attachment opening aligned along the first reference line, wherein the second attachment opening includes an enlarged portion and a groove portion, wherein the second connection interface arrangement further includes a second interlock and a second stop aligned along the second reference line, wherein the first and second interlocks are between the first and second stops, wherein the second interlock fits within the enlarged portion of the second attachment opening when the second connection interface arrangement is in the first position relative to the first connection interface arrangement, wherein the second interlock fits within the groove portion of the second attachment opening when the second connection interface arrangement is in the second position relative to the first connection interface arrangement, and wherein the second stop opposes a closed end of the groove portion of the second attachment opening when the second connection interface arrangement is in the second position relative to the first connection interface arrangement.

13. The mechanical connection interface of claim 1, wherein the second connection interface arrangement defines a latch release opening that aligns with the flexible cantilever latch when the second connection interface arrangement is in the second position relative to the first connection interface arrangement.

14. A mechanical connection interface comprising:
a first connection interface arrangement defining first and second attachment openings aligned along a first reference line, the first and second attachment openings each defining a groove portion and an enlarged portion, the groove portions having lengths that extend along the first reference line and first widths that extend perpendicular to the first reference line, the enlarged portions defining second widths that are larger than the first widths and that are perpendicular to the first reference line, the first connection interface arrangement further including a flexible cantilever latch positioned within the enlarged portion of the first attachment opening, the flexible cantilever latch having a length that extends along the first reference line, the flexible cantilever latch including a base end and a free end, the enlarged portion of the first attachment opening including an interlock receiving portion defined between the free end of the flexible cantilever latch and the groove portion of the first attachment opening, the free end of the flexible cantilever latch defining a first stop surface, the groove portion of the second attachment opening having an end positioned opposite from the enlarged portion of the second attachment opening which defines a second stop surface, and the flexible cantilever latch defining a stop receptacle including a ramp surface;

a second connection interface arrangement including a first interlock, a second interlock, a first stop, and a second stop all aligned along a second reference line, the first and second interlocks being positioned between the first and second stops, the first and second stops including stop surfaces that face at least partially away from the first and second interlocks, the first and second stops having ramp surfaces that face at least partially toward the first and second interlocks, the first and second interlocks defining third widths that extend perpendicular to the second reference line, the third widths being smaller than the second widths of the enlarged portions of the first and second attachment openings, the third widths being larger than the first widths of the groove portions of the first and second attachment openings, and the first and second interlocks being separated by a spacing along the second reference line that corresponds to a spacing between the enlarged portions of the first and second attachment openings along the first reference line;

wherein the second connection interface arrangement is connected to the first connection interface arrangement by orienting the second connection interface arrangement in a first position relative to the first connection interface arrangement in which: a) the first and second reference axes are aligned; b) the first interlock is received within the interlock receiving portion of the enlarged portion of the first attachment opening; c) the second interlock is received within the enlarged portion of the second attachment opening; and d) the first stop is positioned within the stop receptacle of the flexible cantilever latch with the ramp surface of the first stop opposing the ramp surface of the stop receptacle; and then sliding the second connection interface arrangement along the aligned first and second reference axes from the first position to a second position in which: a) the first interlock is received within and interlocked with the groove portion of the first attachment opening; b) the first stop is positioned within the interlock receiving portion of the enlarged portion of the first attachment opening with the stop surface of the first stop opposing the first stop surface at the free end of the flexible cantilever latch; c) the second stop is positioned within the groove portion of the second attachment opening with the stop surface of the second stop opposing the second stop surface at the end of the groove portion of the second attachment opening; and d) the second interlock is received within and interlocked with the groove portion of the second attachment opening; and wherein as the second connection interface arrangement is slid from the first position to the second position the ramp surface of the first stop engages the ramp surface of the stop receptacle to cause deflection of the flexible cantilever latch from a latching position to an unlatched position, and wherein after the first stop moves past the free end of the flexible cantilever latch the flexible cantilever latch elastically returns from the unlatched position to the latching position.

15. The mechanical connection interface of claim 14, wherein the first connection interface arrangement is integrated with a telecommunications component.

16. The mechanical connection interface of claim 15, wherein the telecommunications component includes structure adapted to manage optical fibers.

17. The mechanical connection interface of claim 16, wherein the telecommunications component is a tray.

18. The mechanical connection interface of claim 14, wherein the first connection interface arrangement is integrated with a bracket.

19. The mechanical connection interface of claim 14, wherein the second connection interface arrangement is integrated with a holder adapted to hold a fiber optic component coupled to optical fibers.

20. The mechanical connection interface of claim 19, wherein the fiber optic component is a splice protector, a passive optical power splitter, or a wavelength division multi-plexer.

21. The mechanical connection interface of claim 14, wherein the groove portions and the first and second interlocks have dovetailed shapes in cross-sectional planes that are perpendicular to the first and second reference lines.

22. The mechanical connection interface of claim 14, wherein the stop surfaces of the first and second stops face at least partially in opposite directions, wherein the ramp surfaces of the first and second stops face partially towards each other, and wherein the first and second stop surfaces face at least partially towards each other.

23. The mechanical connection interface of claim 15, wherein a main body of the telecommunications component includes a first portion having a top side and a bottom side, wherein the base end of the flexible cantilever latch is unitarily formed with the main body, wherein the first and second attachment openings extend through the first portion of the main body from the top side to the bottom side, and wherein the stop receptacle of the flexible cantilever latch is defined at a top side of the flexible cantilever latch that is coplanar with the top side of the first portion of the main body when the flexible cantilever latch is in the latching position, and wherein the stop receptacle extends downwardly into the flexible cantilever latch from the top side of the flexible cantilever latch so that the stop receptacle extends lower than the top side of the first portion of the main body when the flexible cantilever latch is in the latching position.

24. The mechanical connection interface of claim 14, wherein the first connection interface arrangement defines a first seating surface through which the first and second attachment openings extend, wherein the second connection interface arrangement defines a second seating surface from which the first interlock, the second interlock, the first stop, and the second stop project, wherein the first and second seating surfaces are flush when the second connection interface arrangement is in the first position relative to the first connection interface arrangement and are also flush when the second connection interface arrangement is in the second position relative to the first connection interface arrangement, wherein the flexible cantilever latch is in the latching position when the second connection interface arrangement is in the first position relative to the first connection interface arrangement, and wherein the flexible cantilever latch is in the latching position when the second connection interface arrangement is in the second position relative to the first connection interface arrangement.

* * * * *